(12) United States Patent
Yakobov

(10) Patent No.: US 10,801,360 B2
(45) Date of Patent: Oct. 13, 2020

(54) PHONIC WHEEL WITH OUTPUT VOLTAGE TUNING

(71) Applicant: PRATT & WHITNEY CANADA CORP., Longueuil (CA)

(72) Inventor: Ella Yakobov, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 145 days.

(21) Appl. No.: 16/023,072

(22) Filed: Jun. 29, 2018

(65) Prior Publication Data
US 2020/0003074 A1    Jan. 2, 2020

(51) Int. Cl.
*F01D 21/00* (2006.01)
*F02C 9/00* (2006.01)
*G01L 3/10* (2006.01)

(52) U.S. Cl.
CPC .............. *F01D 21/003* (2013.01); *F02C 9/00* (2013.01); *G01L 3/101* (2013.01); *F05D 2240/24* (2013.01)

(58) Field of Classification Search
CPC .......... F01D 21/003; F02C 9/00; G01L 3/101; F05D 2240/24
See application file for complete search history.

(56) References Cited

U.S. PATENT DOCUMENTS

| | | | | |
|---|---|---|---|---|
| 4,833,405 A | * | 5/1989 | Richards | G01B 7/02 324/207.16 |
| 8,464,598 B2 | | 6/2013 | Cazaux et al. | |
| 2012/0148400 A1 | * | 6/2012 | Gerez | F01D 21/045 416/1 |
| 2015/0139798 A1 | * | 5/2015 | Duke | G01P 3/488 416/1 |
| 2018/0003073 A1 | | 1/2018 | Rowe et al. | |

FOREIGN PATENT DOCUMENTS

| | | |
|---|---|---|
| EP | 2876046 | 5/2015 |
| EP | 3109409 | 12/2016 |
| EP | 3128332 | 2/2017 |
| EP | 3284665 | 2/2018 |
| EP | 3284666 | 2/2018 |

* cited by examiner

Primary Examiner — Igor Kershteyn
(74) Attorney, Agent, or Firm — Norton Rose Fulbright Canada LLP

(57) ABSTRACT

Herein provided is a phonic wheel for use in a gas turbine engine and associated systems and methods. The phonic wheel comprises a circular disk having first and second opposing faces. The circular disk defines a root surface that extends between and circumscribes the first and second faces. A first plurality of projections extend from the root surface and are oriented substantially parallel to an axis of rotation of the disk. The first plurality of projections are circumferentially spaced substantially equally from one another and each have a first physical configuration. At least one second projection extends from the root surface and is positioned between two adjacent first projections, the at least one second projection having a second physical configuration different from the first physical configuration.

17 Claims, 6 Drawing Sheets

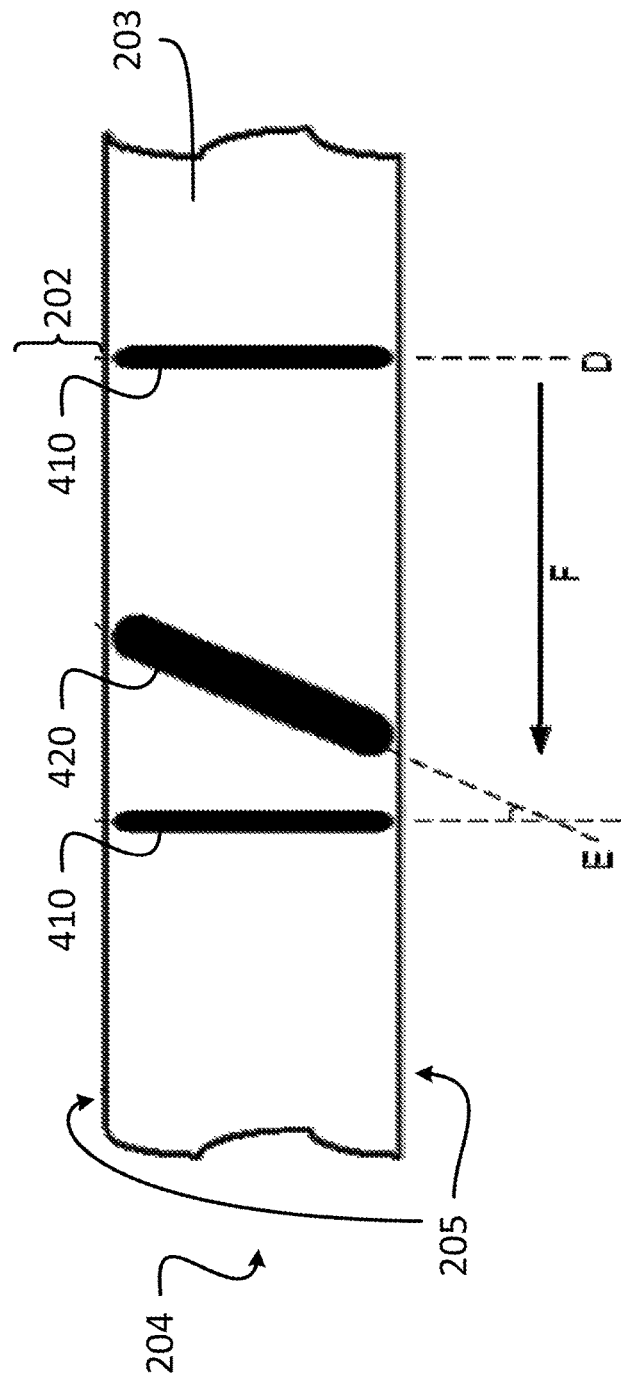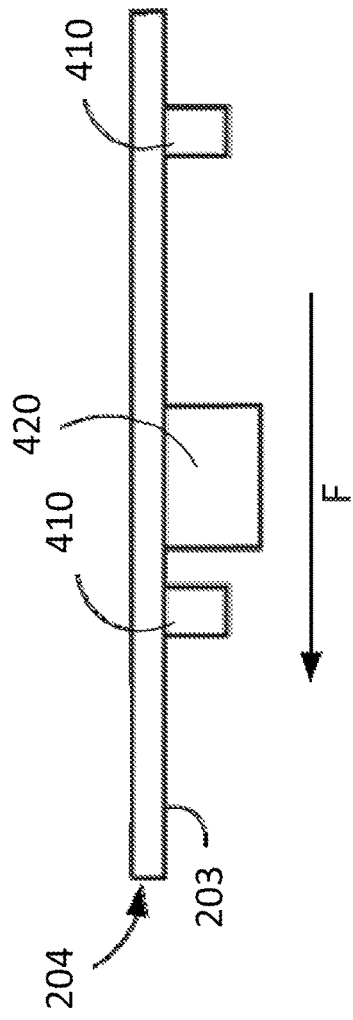

PHONIC WHEEL WITH OUTPUT VOLTAGE TUNING

TECHNICAL FIELD

The present disclosure relates generally to engines, and more specifically to propeller control systems for gas turbine engines.

BACKGROUND OF THE ART

Certain types of phonic wheels can be used to provide information regarding the phase of rotation of the propeller, usually by removing one of the markers, creating a "missing tooth" which can be detected, or by adding an additional marker which is distinguishable from the other markers. However, existing approaches can lead to inaccurate measurements.

Therefore, improvements are needed.

SUMMARY

In accordance with a broad aspect, there is provided a phonic wheel for use in a gas turbine engine, the phonic wheel comprising: a circular disk having first and second opposing faces, the circular disk defining a root surface that extends between and circumscribes the first and second faces; a first plurality of projections extending from the root surface and oriented substantially parallel to an axis of rotation of the disk, the first plurality of projections circumferentially spaced substantially equally from one another and each having a first physical configuration; and at least one second projection extending from the root surface and positioned between two adjacent first projections, the at least one second projection having a second physical configuration different from the first physical configuration.

In some embodiments, the at least one second projection having a second physical configuration different from the first physical configuration comprises the at least one second projection having a height greater than that the first plurality of projections.

In some embodiments, the at least one second projection having a second physical configuration different from the first physical configuration comprises the at least one second projection having a width greater than that of the first plurality of projections.

In some embodiments, the at least one second projection having a second physical configuration different from the first physical configuration comprises the at least one second projection having a shape different from that of the first plurality of projections.

In some embodiments, the at least one second projection having a second physical configuration different from the first physical configuration comprises the at least one second projection being fabricated from a material different than that from which the first plurality of projections are fabricated.

In some embodiments, the at least one second projection is positioned substantially equidistant between the two adjacent ones of the first plurality of projections.

In some embodiments, the at least one second projection is positioned closer to a particular one of the two adjacent ones of the first plurality of projections than to a second one thereof.

In some embodiments, the at least one second projection is disposed on the root surface at an angle relative to the first plurality of projections.

In some embodiments, the at least one second projection is disposed at a 45° angle relative to the first plurality of projections.

In accordance with another broad aspect, there is provided a phonic wheel system for a gas turbine engine. The system comprises a phonic wheel and a sensor. The a phonic wheel comprises: a first plurality of projections extending from a root surface of the phonic wheel and oriented substantially parallel to an axis of rotation of the phonic wheel, the first plurality of projections circumferentially spaced substantially equally from one another and each having a first physical configuration; and at least one second projection extending from the root surface and positioned between two adjacent first projections, the at least one second projection having a second physical configuration different from the first physical configuration. The sensor is adjacent the phonic wheel and configured to sense passage of the first plurality of projections and the at least one second projection as the phonic wheel rotates.

In some embodiments, the sensor is further configured for producing, in response to sensing the first plurality of projections and the at least one second projection, a signal pulse comprising a series of first pulses and at least one second pulse, wherein the at least one second pulses produced in response to sensing the at least one second projection are substantially equalized with the series of first pulses produced in response to sensing the first plurality of projections due to the second physical configuration being different from the first physical configuration.

In some embodiments, in the sensor is configured for sensing within a sensing zone, wherein the second physical configuration being different from the first physical configuration causes a portion of the at least one second projection in the sensing zone to be substantially equivalent to a portion of one of the first projections to equalize the at least one second pulse with the series of first pulses.

In some embodiments, the at least one second projection having a second physical configuration different from the first physical configuration comprises the at least one second projection having at least one of a height, a width, and a shape different than that the first plurality of projections.

In some embodiments, the at least one second projection is positioned substantially equidistant between the two adjacent ones of the first plurality of projections.

In some embodiments, the at least one second projection is positioned closer to a particular one of the two adjacent ones of the first plurality of projections than to a second one thereof.

In some embodiments, the at least one second projection is disposed on the root surface at an angle relative to the first plurality of projections.

In some embodiments, the at least one second projection is disposed at a 45° angle relative to the first plurality of projections.

In accordance with a still further embodiment, there is provided a method for sensing a phonic wheel in a gas turbine engine, the phonic wheel defining a root surface that extends between and circumscribes first and second faces. The method comprises: producing a series of first signal pulses responsive to detecting, within a sensing zone of a sensor, a first plurality of projections extending from the root surface and circumferentially spaced substantially equally from one another, the first plurality of projections having a first physical configuration, the series of first signal pulses forming part of a signal; and producing at least one second signal pulse responsive to detecting, within the sensing zone of the sensor, at least one second projection extending from the root surface and positioned between two adjacent first projections, the at least one second projection having a second physical configuration different from the first physical configuration, the at least one second signal pulse forming part of the signal; the first and second signal pulses being equalized due to a portion of the at least one second projection sensed in the sensing zone being substantially equivalent to a portion of one of the first projections sensed in the sensing zone, as a result of the first physical configuration being different from the second physical configuration.

In some embodiments, the at least one second signal pulse is produced responsive to detecting the at least one second projection having the second physical configuration comprising at least one of a second height, second width, and a second shape different from the first physical configuration comprising a corresponding at least one of a first height, a first width, and a first shape.

In some embodiments, the at least one second signal pulse is produced responsive to detecting the at least one second projection fabricated from a second material different than a first material from which the first plurality of projections are fabricated.

In accordance with a further broad aspect, there is provided a gas turbine engine having a phonic wheel assembly, the phonic wheel assembly comprising: a phonic wheel having a first plurality of projections extending from a central disk root surface to a tip, the projections oriented substantially parallel to a disc axis of rotation, the first plurality of projections circumferentially spaced substantially equally from one another and each having a first tip shape, and at least one second projection extending from the root surface to a tip and positioned between two adjacent first projections, the second projection having a second tip shape different from the first tip shape; and a sensor adjacent the phonic wheel configured for sensing passage of the projections as the wheel rotates.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 4A-B are schematic bottom and side views, respectively, of embodiments of the phonic wheel of FIG. 2;

It will be noted that throughout the appended drawings, like features are identified by like reference numerals.

DETAILED DESCRIPTION

Figure 1:
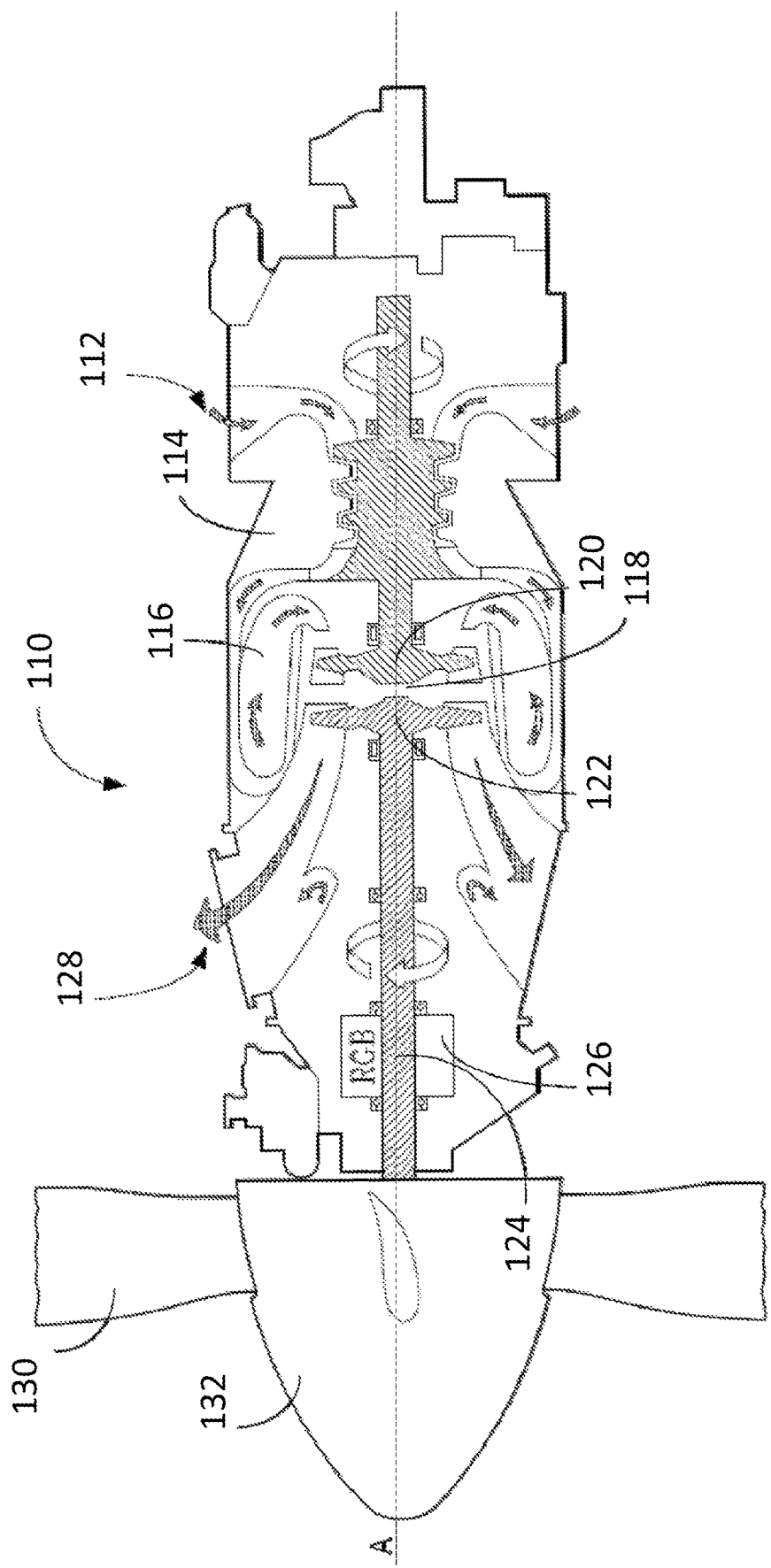
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 20 and rotatingly drives a rotor shaft 124 about a propeller shaft axis 'A' through a reduction gearbox 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
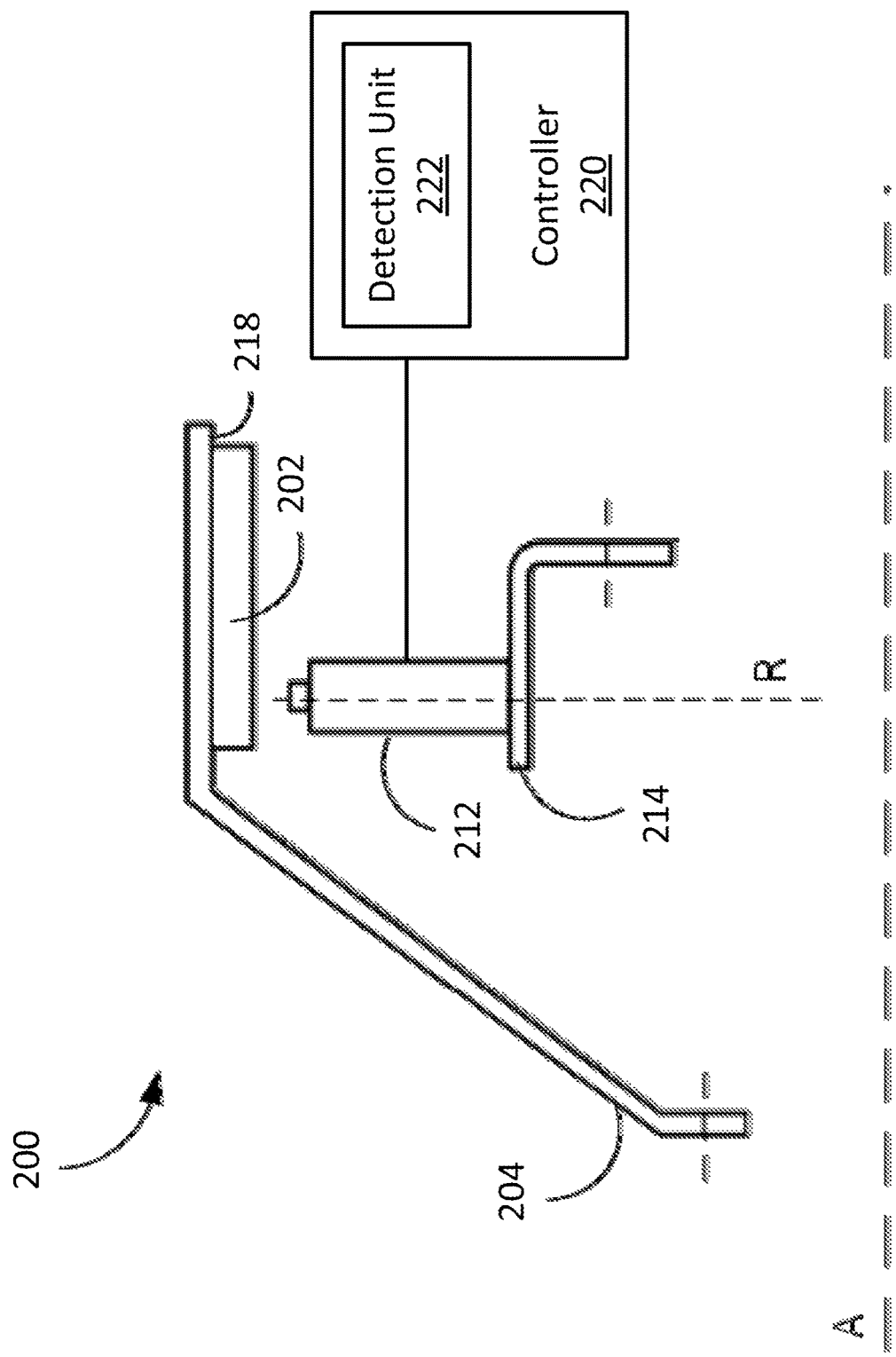
FIG. 2 is a schematic diagram of an example system for sensing a phonic wheel.

With reference to FIG. 2, a system 200 for sensing a phonic wheel 204 will now be described. In some embodiments, the system 200 provides for detection and measurement of rotational velocity of one or more rotating elements of the engine 110, for example the propeller 130, and of other propeller-related parameters, for instance propeller blade angle. The system 200 may interface to existing mechanical interfaces of typical propeller systems to provide a digital detection for electronic determination of the propeller blade angle. It should be noted that although the present disclosure focuses on the use of the system 200 and the phonic wheel 204 in gas-turbine engines, similar techniques can be applied to other types of engines, including electric engines.

The system 200 comprises an annular member 204 and one or more sensors 212 positioned proximate the annular member 204. Annular member 204 (referred to herein as a phonic wheel) has a plurality of position markers 202 provided thereon for detection by sensor 212. In some embodiments, the phonic wheel 204 is mounted for rotation with propeller 130 and to move axially with adjustment of the blade angle of the blades of the propeller 130, and the sensor 212 is fixedly mounted to a static portion of the engine 110 and/or the propeller 130. In other embodiments, the sensor 212 is mounted for rotation with propeller 130 and to move axially with adjustment of the blade angle of the blades of the propeller 130, and the phonic wheel 204 is fixedly mounted to a static portion of the engine 110 and/or the propeller 130.

The system 200 also includes a controller 220 communicatively coupled to the sensor 212. The sensor 212 is configured for producing a signal, for instance an electrical or optical signal, which is transmitted to or otherwise received by the controller 220, for example via a detection unit 222 thereof. In some embodiments, the sensor 212 produces a series of signal pulses in response to detecting the presence of a position marker 202 in a sensing zone of the sensor 212. For example, the sensor 212 operates on detecting changes in magnetic flux, and has a sensing zone which encompasses a circular or rectangular area or volume in front of the sensor 212. When a position marker 202 is present in the zone, or passes through the zone during rotation of the phonic wheel 204, the magnetic flux in the sensing zone is varied by the presence of the position marker 202, and the sensor 212 can produce a signal pulse, which forms part of the signal.

Figure 3:
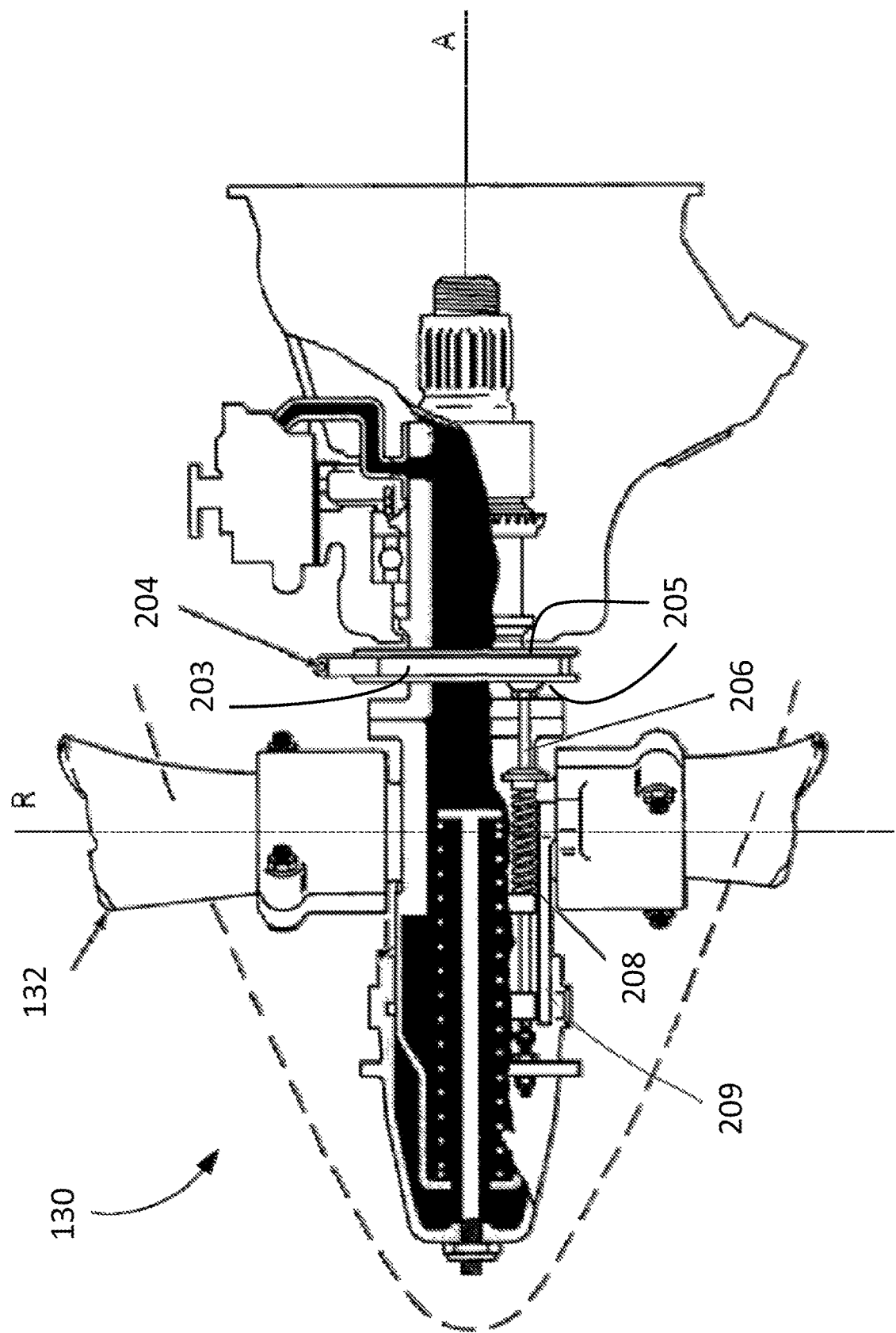
FIG. 3 is a schematic diagram of the propeller of FIG. 1 with the phonic wheel of FIG. 2, in accordance with an embodiment.

In the example illustrated in FIG. 3, a side view of a portion of phonic wheel 104 and sensor 212 is shown. The sensor 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 3 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the phonic wheel 204 and the position markers 202. In some other embodiments, in order to provide redundancy, one or more additional sensors, which may be similar to the sensor 212, are provided. For example, an additional sensor 212 may be mounted in a diametrically opposite relationship relative to the position markers 202, which extend away from the phonic wheel 204 and towards the sensor(s) 212. In yet another embodiment, several position markers 102 may be spaced equiangularly about the perimeter of the phonic wheel 104. Other embodiments may apply.

With reference to FIG. 3, in some embodiments the phonic wheel 204 is embodied as a circular disk which rotates as part of the engine 110, for example with the output shaft 124 or with the propeller 130. The phonic wheel 204 comprises opposing faces 205 and defines a root surface 203 which extends between the opposing faces 205 and circumscribes them. Put differently, the root surface 203 of the phonic wheel 204 is the outer periphery of the circular disk which spans between the two opposing faces 205. In these embodiments, the position markers 202 can take the form of projections which extend from the root surface 203, as illustrated in FIGS. 4A-B and discussed in greater detail hereinbelow.

With continued reference to FIG. 3, the phonic wheel 204 is supported for rotation with the propeller 30, which rotates about the longitudinal axis 'A'. The phonic wheel 204 is also supported for longitudinal sliding movement along the axis A, e.g. by support members, such as a series of circumferentially spaced beta feedback rods 206 that extend along the longitudinal axis 'A'. A compression spring 208 surrounds an end portion of each rod 206.

As depicted in FIG. 3, the propeller 130 comprises a plurality of angularly arranged blades 132, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

With reference to FIGS. 4A-B, different embodiments of the phonic wheel 204 are illustrated. As discussed hereinabove, the phonic wheel 204 comprises the position markers 202, which can take the form of projections which extend from the root surface 203. As the phonic wheel 204 rotates, varying portions thereof enter, pass through, and then exit the sensing zone of the sensor 212. From the perspective of the sensor 212, the phonic wheel moves along direction 'F' as the phonic wheel rotates.

In FIG. 4A, a top-view of a portion of the phonic wheel 204 is shown. In the illustrated embodiment, the position markers 202 include a plurality of projections 410 which are arranged along direction 'E', which is substantially transverse to the opposing faces 205. Although only two projections 410 are illustrated in FIG. 4A, it should be understood that any suitable number of projections 410 may be present across the whole of the root surface 203. The projections 410 can be substantially equally spaced from one another on the root surface 203. In addition, the projections 410 are of substantially a common shape and size, for example having a common volumetric size.

The phonic wheel 204 also includes at least one supplementary projection 420 which is positioned between two adjacent ones of the projections 410. In the embodiment depicted in FIG. 4A, the projection 420 is oriented along direction 'D', which is at an angle relative to direction 'E'. The angle between directions D' and 'E' can be any suitable value between 1° and 89°, for example 30°, 45°, 60°, or any other value, as appropriate. It should be noted, however, that in some other embodiments the supplementary projection 420 can be co-oriented with the projections 410, for instance along direction 'E', as shown in FIG. 4B.

In some embodiments, the phonic wheel 204 includes only a single supplementary projection 420; in other embodiments, the phonic wheel 204 can include two, three, four, or more supplementary projections 420. In embodiments in which the phonic wheel 204 includes more than one supplementary projection 420, the supplementary projections can be oriented along a common orientation, for instance direction 'D', or can be oriented along one or more different orientations. The projection 420 can be located at substantially a midpoint between two adjacent projections 410, or can be located close to a particular one of two adjacent projections 410.

In embodiments in which the projection 420 is angled with respect to the projections 410, the change in magnetic flux caused by the presence of the projection 420 may be different than that caused by the presence of the projection 410. For example, due to the shape of the sensing zone of the sensor 212, the change in magnetic flux produced by the presence of the projection 420 may be less than the change in magnetic flux produced by the presence of one of the projections 410. As a result, the signal pulse (referred to herein as a second signal pulse) produced in response to the sensor 212 detecting the presence of the projection 420 may be smaller, or less pronounced, than a corresponding signal pulse (referred to herein as a first signal pulse) produced in response to the sensor 212 detecting the presence of the projection 410. The uneven nature of the first and second signal pulses can complicate signal processing of the signal produced by the sensor 212, for example for the controller 220, and can lead to inaccurate measurements.

In order to equalize the signal pulses produced by the sensor 212, the projections 410 and the projection 420 are designed to have different physical configurations. That is to say, the projections 410 and the projection 420 can be of different shapes, different sizes, and/or made of different materials, so that the change in magnetic flux sensed by the sensor 212 and produced by the presence of the projection 420 in the sensing zone is substantially identical to the change in magnetic flux sensed by the sensor 212 and produced by the presence of any one of the projections 410.

In some embodiments, the projections 410, 420 extend to form a tip, and it is a tip shape of the projections 420 which is shaped differently from the tip shape of the projections 410.

For example, the projection 420 can have a dimension (e.g. a height, a width, and/or a length) that is greater than for the projections 410, such that the volumetric size of the projection 420 is greater than that of the projections 410. In some cases, the projections 410 can be machined to be smaller, thinner, shorter, and/or of a different shape than the projections 420, and in some other cases, the projection 420 is formed to be taller, wider, longer, and/or of a different shape than the projections 410. For example, the projection 420 can extend beyond a plane formed by one or both of the opposing faces 205. Any other suitable differentiation in dimensions between the projections 410, 420 is also considered.

When the projection 420 is angled with respect to the projections 410, the sensor 212 may detect substantially the whole of one of the projections 410 when it enters the sensing zone of the sensor 212, but only a portion of the projection 420 when it enters the sensing zone. By providing different volumetric sizes for the projections 410 and the projection 420, whether as a result of different dimensions (e.g. heights, widths, and/or lengths), the portion of the projection 420 sensed by the sensor 212 in the sensing zone can be made comparable to that for the projections 410. Thus, the second signal pulse produced by the sensor 212 in response to the presence of the projection 420 can be tuned to be substantially equal to that produced in response to the presence of one of the projections 410.

It should be noted that, as used herein, the terms "equal" and "equalize" are understood to refer to substantial equivalence to within a particular tolerance or range. For example, if the projections 410 produce electrical signal pulses having an amplitude of approximately 1 Volt (V), an electrical signal pulse produced by the projection 420 can be considered equal if it has an amplitude within a window of 1%, 5%, 10%, 15%, 20%, or any other suitable tolerance, around 1 V. For instance, if the projection 420 produces an electrical signal pulse with an amplitude of 0.95 V, this can be considered equal to the electrical signal pulse produced by the projections 410, and the magnetic flux response of the projections 410 and the projection 420 are said to be equalized.

Alternatively, or in addition, the shape of the projection 420, or the material of which it is composed, can be different than that of the projections 410. For instance, the projection 420 can be provided in a shape that increases the magnetic flux change observed by the sensor 212, such as a different rectangular shape, a trapezoidal shape, a pyramidal shape, and the like. In another example, the projection 420 can be fabricated with a material which produces a greater change in magnetic flux. For instance, if the projections 410 and the projection 420 are similarly sized, but the projection 420 is angled 45° with respect to the projections 410, the projection 420 can be made of a material which induces twice as much change in magnetic flux as the material used for the projections 410. Still other approaches are considered.

In FIG. 4A, the projection 420 is shown as being thicker than the projections 410. With reference to FIG. 4B, the projection 420 is shown as being taller than the projections 410. It should be noted that any combination of suitable changes to the projection 420, or to the projections 410, or both, can be employed in order to equalize the signal pulses produced by the sensor 212. For example, the projection 420 can be both taller and wider than the projections 410. In another example, the projection 420 can be wider and of a different material than the projections 410. Still other combinations are considered.

In some embodiments, the dimensions of the projections 410 and/or the projection 420 is established iteratively, in order to produce projections 410, 420 which result in substantially equal signal pulses, when sensed by the sensor 212. The iterative process for determining the dimensions of the projections 410, 420 can be performed with physical phonic wheels and/or using modelling tools. Similar techniques can be applied when the material used to make the projections 410 and/or the projection 420 is varied.

The signal pulses produced by the sensor 212, which form part of the signal received by the controller 220, can be used to determine various operating parameters of the engine 110 and/or of the propeller 130. For example, the series of first signal pulses can be indicative of the speed of rotation of the engine 110 and/or the propeller 130, and the second signal pulse can be indicative of a phase of the propeller 130.

Although the preceding paragraphs focus on the use of the sensor 212 which detects changes in magnetic flux due to the presence of one of the projections 410, 420 in the sensing zone of the sensor, it should be understood that other types of sensors are also considered. For instance, an optical sensor which detects reflectivity of light off of position markers 202 can be used, and in this case the projections 420 can have a physical configuration which increases the reflectivity of the projections 420. In another example, an acoustic sensor which performs detection of position markers 202 using echoed sound waves can be used, and in this case the projections 420 can have a physical configuration which increases the degree to which incoming sound waves are reflected toward the acoustic sensor. Still other embodiments are considered.

In addition, the present disclosure focuses primarily on embodiments in which the position markers 202 are projections, it should be noted that the techniques described herein may also be applied to other types of position markers 202. For instance, in some embodiments, the position markers 202 are embedded in the circular disk portion of the phonic wheel 204, such that the phonic wheel 204 has a substantially smooth or uniform root surface 203. For example, a position marker 202 can be a portion of the phonic wheel 204 which is made of a different material, or to which is applied a layer of a different material. The area of the different material can be varied in order to tune the pulses produced by the sensor 212. Still other embodiments are considered.

Figure 5:
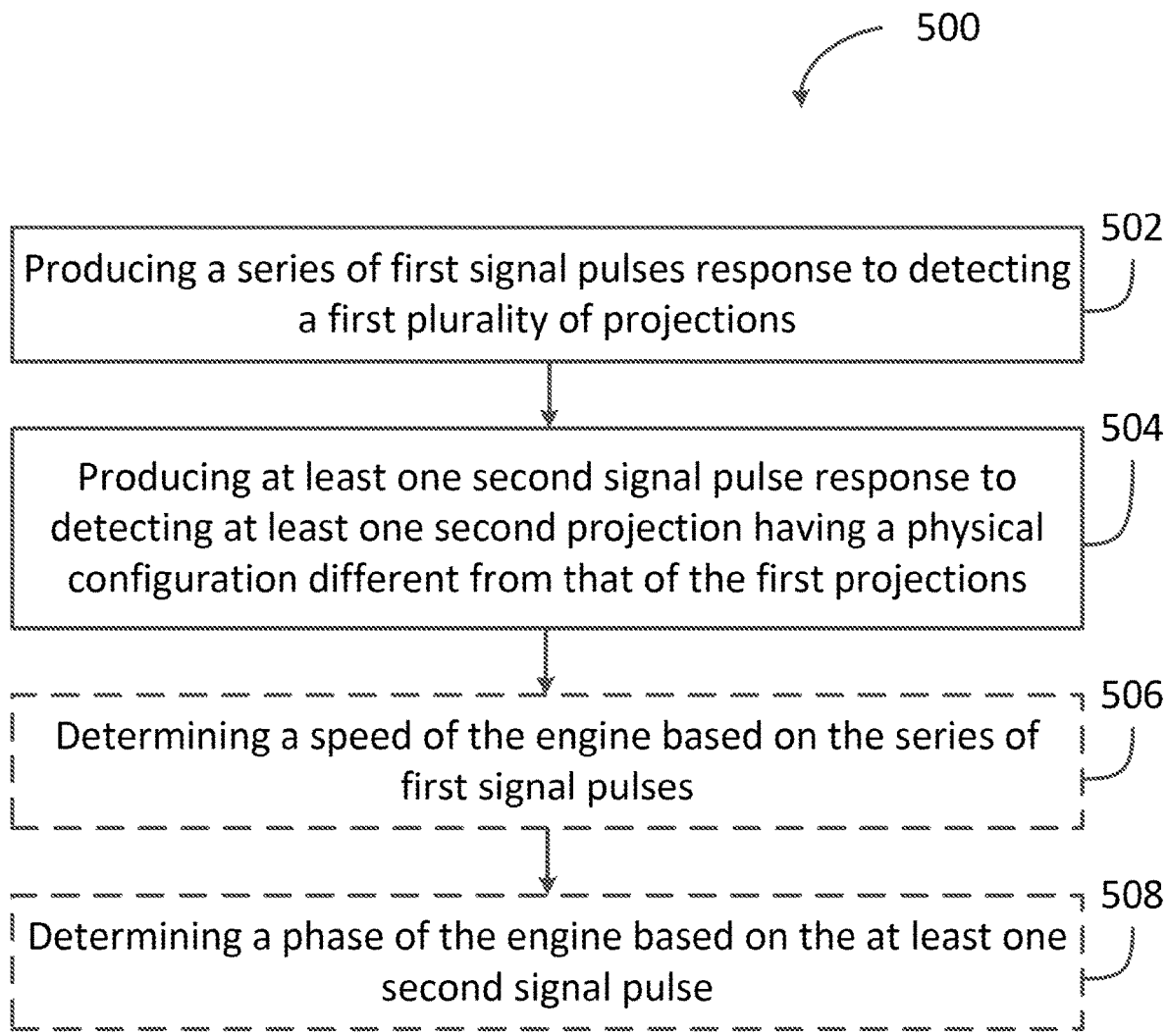
FIG. 5 is flowchart of an example method for monitoring vibration in an engine.

With reference to FIG. 5, there is illustrated a method for sensing a phonic wheel in an engine and/or of a propeller, for instance the phonic wheel 204. At step 502, a series of first signal pulses are produced via a sensor, for instance the sensor 212, in response to detecting a first plurality of projections, for example the projections 410. At step 504, at least one second signal pulse is produced via the sensors 212 in response to detecting at least one second projection, for example the projection 420, which has a physical configuration different from that of the first projections.

In embodiments where the projection 420 is located substantially equidistantly between adjacent projections 410, the time between sensing a first projection 410 and sensing the projection 420 can be substantially equal to the time between sensing the projection 420 and a sensing a subsequent one of the projections 410. In embodiments where the projection 420 is located closer to a particular one of the projections 410 than to a subsequent one of the projections 410, the duration between detecting the particular projection 410 and the projection 420 may be shorter than the duration between detecting the projection 420 and the subsequent projection 410.

Optionally, at steps 506 and 508, a speed of the engine 110 and/or the propeller 130, and/or a phase of the propeller 130 can be determined based on the series of first signal pulses and based on the at least one second signal pulse, respectively.

Figure 6:
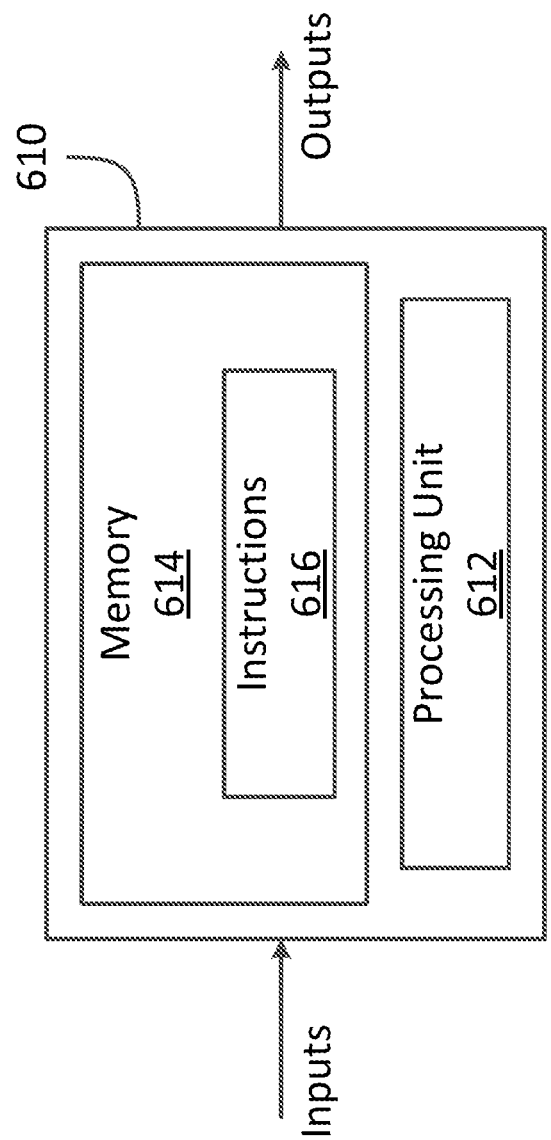
FIG. 6 is a block diagram of an example computer system for implementing part or all of the method of FIG. 5.

With reference to FIG. 6, the method 500 may be implemented by a computing device 610, comprising a processing unit 612 and a memory 614 which has stored therein computer-executable instructions 616. For example, the controller 220 may be embodied as the computing device 610. The processing unit 612 may comprise any suitable devices configured to implement the method 500 such that instructions 616, when executed by the computing device 610 or other programmable apparatus, may cause the functions/acts/steps performed as part of the method 500 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

It should be noted that the computing device 610 may be implemented as part of a FADEC or other similar device, including electronic engine control (EEC), engine control unit (EUC), and the like. In addition, it should be noted that the method 500 and, more generally, the techniques described herein can be performed substantially in real-time, during operation of the engine 110. For example, if the engine 110 is used as part of an aircraft, the monitoring of the engine 110 can be performed in real-time during a flight mission. The results of the monitoring can be reported to the operator and adjustments to the operational parameters of the engine 110 can also be performed in real-time.

The phonic wheel and related systems and methods described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the phonic wheel and related systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A phonic wheel for use in a gas turbine engine, the phonic wheel comprising:
   a circular disk having first and second opposing faces, the circular disk defining a root surface that extends between and circumscribes the first and second faces;
   a first plurality of projections extending from the root surface and oriented substantially parallel to an axis of rotation of the disk, the first plurality of projections circumferentially spaced substantially equally from one another and each having a first physical configuration which produces a first signal pulse when detected within a sensing zone of a sensor; and
   at least one second projection extending from the root surface at an angle relative to the first plurality of projections and positioned between two adjacent first projections, the at least one second projection having a second physical configuration different from the first physical configuration which produces a second signal pulse when detected with the sensing zone of the sensor, the second signal pulse being equalized relative to the first signal pulse.

2. The phonic wheel of claim 1, wherein the at least one second projection having a second physical configuration different from the first physical configuration comprises the at least one second projection having a height greater than that the first plurality of projections.

3. The phonic wheel of claim 1, wherein the at least one second projection having a second physical configuration different from the first physical configuration comprises the at least one second projection having a width greater than that of the first plurality of projections.

4. The phonic wheel of claim 1, wherein the at least one second projection having a second physical configuration different from the first physical configuration comprises the at least one second projection having a shape different from that of the first plurality of projections.

5. The phonic wheel of claim 1, wherein the at least one second projection having a second physical configuration different from the first physical configuration comprises the at least one second projection being fabricated from a material different than that from which the first plurality of projections are fabricated.

6. The phonic wheel of claim 1, wherein the at least one second projection is positioned substantially equidistant between the two adjacent ones of the first plurality of projections.

7. The phonic wheel of claim 1, wherein the at least one second projection is positioned closer to a particular one of the two adjacent ones of the first plurality of projections than to a second one thereof.

8. The phonic wheel of claim 1, wherein the at least one second projection is disposed at a 45° angle relative to the first plurality of projections.

9. A phonic wheel system for a gas turbine engine, the system comprising:
a phonic wheel, comprising:
a first plurality of projections extending from a root surface of the phonic wheel and oriented substantially parallel to an axis of rotation of the phonic wheel, the first plurality of projections circumferentially spaced substantially equally from one another and each having a first physical configuration; and
at least one second projection extending from the root surface at an angle relative to the first plurality of projections and positioned between two adjacent first projections, the at least one second projection having a second physical configuration different from the first physical configuration; and
a sensor adjacent the phonic wheel and configured for:
sensing passage of the first plurality of projections and the at least one second projection as the phonic wheel rotates; and
producing, in response to sensing the first plurality of projections and the at least one second projection, a signal comprising a series of first pulses and at least one second pulse, wherein the at least one second pulse produced in response to sensing the at least one second projection are substantially equalized with the series of first pulses produced in response to sensing the first plurality of projections due to the second physical configuration being different from the first physical configuration.

10. The phonic wheel of claim 9, wherein the sensor is configured for sensing within a sensing zone, wherein the second physical configuration being different from the first physical configuration causes a portion of the at least one second projection in the sensing zone to be substantially equivalent to a portion of one of the first projections to equalize the at least one second pulse with the series of first pulses.

11. The phonic wheel system of claim 9, wherein the at least one second projection having a second physical configuration different from the first physical configuration comprises the at least one second projection having at least one of a height, a width, and a shape different than that the first plurality of projections.

12. The phonic wheel system of claim 9, wherein the at least one second projection is positioned substantially equidistant between the two adjacent ones of the first plurality of projections.

13. The phonic wheel system of claim 9, wherein the at least one second projection is positioned closer to a particular one of the two adjacent ones of the first plurality of projections than to a second one thereof.

14. The phonic wheel system of claim 9, wherein the at least one second projection is disposed at a 45° angle relative to the first plurality of projections.

15. A method for sensing a phonic wheel in a gas turbine engine, the phonic wheel defining a root surface that extends between and circumscribes first and second faces, the method comprising:
producing a series of first signal pulses responsive to detecting, within a sensing zone of a sensor, a first plurality of projections extending from the root surface and circumferentially spaced substantially equally from one another, the first plurality of projections having a first physical configuration, the series of first signal pulses forming part of a signal; and
producing at least one second signal pulse responsive to detecting, within the sensing zone of the sensor, at least one second projection extending from the root surface at an angle relative to the first plurality of projections and positioned between two adjacent first projections, the at least one second projection having a second physical configuration different from the first physical configuration, the at least one second signal pulse forming part of the signal;
the first and second signal pulses being equalized due to a portion of the at least one second projection sensed in the sensing zone being substantially equivalent to a portion of one of the first projections sensed in the sensing zone, as a result of the first physical configuration being different from the second physical configuration.

16. The method of claim 15, wherein the at least one second signal pulse is produced responsive to detecting the at least one second projection having the second physical configuration comprising at least one of a second height, second width, and a second shape different from the first physical configuration comprising a corresponding at least one of a first height, a first width, and a first shape.

17. The method of claim 15, wherein the at least one second signal pulse is produced responsive to detecting the at least one second projection fabricated from a second material different than a first material from which the first plurality of projections are fabricated.

* * * * *